US009905824B2

(12) United States Patent
Ryu et al.

(10) Patent No.: US 9,905,824 B2
(45) Date of Patent: Feb. 27, 2018

(54) SEPARATOR FOR ELECTROCHEMICAL DEVICE

(71) Applicant: LG CHEM, LTD., Seoul (KR)

(72) Inventors: Bi-Oh Ryu, Daejeon (KR); Kyung-Hwan Yoon, Daejeon (KR); Heon-Sik Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 226 days.

(21) Appl. No.: 14/917,683

(22) PCT Filed: Dec. 17, 2014

(86) PCT No.: PCT/KR2014/012496
§ 371 (c)(1),
(2) Date: Mar. 9, 2016

(87) PCT Pub. No.: WO2015/093852
PCT Pub. Date: Jun. 25, 2015

(65) Prior Publication Data
US 2016/0218340 A1    Jul. 28, 2016

(30) Foreign Application Priority Data

Dec. 17, 2013 (KR) .................. 10-2013-0157285
Dec. 27, 2013 (KR) .................. 10-2013-0165969
Dec. 17, 2014 (KR) .................. 10-2014-0182526

(51) Int. Cl.
*H01M 2/16* (2006.01)
*H01M 2/18* (2006.01)
(Continued)

(52) U.S. Cl.
CPC ............. *H01M 2/166* (2013.01); *B32B 27/14* (2013.01); *H01M 2/145* (2013.01); *H01M 2/162* (2013.01);
(Continued)

(58) Field of Classification Search
None
See application file for complete search history.

(56) References Cited

U.S. PATENT DOCUMENTS 7,112,389 B1 * 9/2006 Arora ................... H01M 2/162
361/502
2006/0078791 A1    4/2006 Hennige et al.
(Continued)

FOREIGN PATENT DOCUMENTS

CN          1717820 A     1/2006
EP          1 920 920 A1  5/2008
(Continued)

OTHER PUBLICATIONS

International Search Report, issued in PCT/JP2014/012496, dated Mar. 31, 2015.

*Primary Examiner* — Alix Eggerding
(74) *Attorney, Agent, or Firm* — Birch, Stewart, Kolasch & Birch, LLP

(57) ABSTRACT

Disclosed is a separator for an electrochemical device including a porous polymer film, and a porous coating layer including at least one type of particles of inorganic particles and organic particles and binder polymer, the porous coating layer formed on one surface or both surfaces of the porous polymer film, wherein the porous polymer film has a structure in which multiple fibrils arranged parallel to the surface of the film are stacked in layers, and the fibrils are bound to each other to form a lamellar structure with a size from 130 to 200 nm and tortuosity of the porous polymer film is from 1.60 to 1.90, and an electrochemical device comprising the same.

15 Claims, 13 Drawing Sheets
(11 of 13 Drawing Sheet(s) Filed in Color)

(51) Int. Cl.
 *H01M 10/0525* (2010.01)
 *B32B 27/14* (2006.01)
 *H01M 2/14* (2006.01)
 *H01M 10/052* (2010.01)
 *C09D 123/06* (2006.01)

(52) U.S. Cl.
 CPC ....... *H01M 2/1653* (2013.01); *H01M 2/1666* (2013.01); *H01M 2/1686* (2013.01); *H01M 2/18* (2013.01); *H01M 10/0525* (2013.01); *B32B 2457/00* (2013.01); *C09D 123/06* (2013.01); *H01M 10/052* (2013.01)

(56) References Cited

U.S. PATENT DOCUMENTS

| | | |
|---|---|---|
| 2009/0111026 A1 | 4/2009 | Kim et al. |
| 2012/0015254 A1 | 1/2012 | Lee et al. |
| 2014/0167329 A1* | 6/2014 | L'Abee .............. D01D 5/0007 264/465 |
| 2014/0248525 A1* | 9/2014 | Iwai .................... H01M 2/1686 429/144 |
| 2015/0118540 A1* | 4/2015 | Fujiwara ............... H01M 2/162 429/144 |

FOREIGN PATENT DOCUMENTS

| | | |
|---|---|---|
| EP | 2 328 220 A2 | 6/2011 |
| EP | 2 999 028 A1 | 3/2016 |
| EP | 3 024 061 A1 | 5/2016 |
| JP | 2004-63343 A | 2/2004 |
| JP | 2011-210574 * | 10/2011 |
| KR | 10-0727248 B1 | 6/2007 |
| KR | 10-2008-0101043 A | 11/2008 |
| KR | 10-2011-0057079 A | 5/2011 |
| KR | 10-2013-0122570 A | 11/2013 |

* cited by examiner

SEPARATOR FOR ELECTROCHEMICAL DEVICE

TECHNICAL FIELD

The present disclosure relates to a separator for an electrochemical device, and more particularly, to a separator for an electrochemical device that exhibits improved hipot characteristics and enhanced mechanical and thermal performance, has a low tortuosity value, and contributes to cycle characteristic improvement of an electrochemical device.

The present application claims priority to Korean Patent Application No. 10-2013-0157285 filed in the Republic of Korea on Dec. 17, 2013, the disclosure of which is incorporated herein by reference.

Also, the present application claims priority to Korean Patent Application No. 10-2013-0165969 filed in the Republic of Korea on Dec. 27, 2013, the disclosure of which is incorporated herein by reference.

Also, the present application claims priority to Korean Patent Application No. 10-2014-0182526 filed in the Republic of Korea on Dec. 17, 2014, the disclosure of which is incorporated herein by reference.

BACKGROUND ART

In a battery assembly process of a separator for a secondary battery, a hipot test is carried out by applying a high pressure voltage with an aim to detect of a pin-hole of the separator, thickness non-uniformity of the separator, and impurities.

The term 'hipot' as used herein is an abbreviation of 'high-potential' and is a word being widely known in the art, and is understood as representing a sort of electrical safety testing means used to prove the electrical insulation in electrical products such as electrochemical devices. To conduct a hipot test, a dielectric breakdown test, a dielectric withstanding voltage test, and an insulation resistance test are generally carried out, and a dielectric breakdown voltage in the dielectric breakdown test may be carried out, for example, by measuring a breakdown voltage when dielectric failure occurs.

The conditions of satisfying the hipot test have a trade-off relationship with the requirements for secondary batteries in recent years, that is, a reduction in separator thickness for high capacity, an increase in separator porosity for high rate characteristics, loading of organic particles/inorganic particles and an increase in loading amount for improved thermal properties, and a change requirement of a cathode active material.

More specifically, first, a correlation between the separator thickness and the hipot characteristics is as follows.

It is known that the discharge start voltage follows Paschen's Law as represented by the following equation:

$V$(discharge start voltage)$\propto P$(gas pressure)$\times D$(distance between electrodes)

That is, as the separator thickness reduces, the discharge start voltage increases in proportion to the distance between electrodes.

Subsequently, a correlation between the separator porosity and the hipot characteristics is as follows.

In a hipot test, a medium of a leakage current is gas, and a separator serves as a barrier to prevent it. Thus, as the separator porosity increases, a gas fraction increases but the barrier becomes thinner.

Also, a correlation between a porous coating layer in a separator and the hipot characteristics is as follows.

Under the assumption of no impurities, a separator acts as a dielectric barrier during a hipot test. That is, as a dielectric constant of a separator decreases, a dielectric barrier increases and thereby a discharge start voltage increases. A film-type separator, for example, a separator manufactured using a polyolefin-based film has the same dielectric constant, but a separator with a porous coating layer formed on a porous substrate such as a polyolefin-based film has different dielectric constants due to the presence of the porous coating layer. For example, a dielectric constant of a polyethylene film is 2.25, while a dielectric constant of alumina is 9 or more. Thus, even a separator of the same thickness may have different dielectric breakdown voltages based on whether or not the separator includes a porous coating layer on at least one surface of a porous substrate, and the dielectric breakdown voltage may change based on the density of organic particles/inorganic particles included in the porous coating layer.

Also, recently, the demand for high capacity/high power batteries is gradually increasing in small and medium and large battery markets, and a thin-film separator suitable for high capacity/high power battery design needs to have low electrical resistance and maintain stability.

Such a thin-film separator has poor thermal/mechanical properties, and thus, to enhance the safety, a composite separator is manufactured by applying organic/inorganic heat-resistant coating. However, an organic/inorganic heat-resistant coating layer serves as a resistive layer which blocks a flow of lithium ions and has a negative influence on cycle characteristics. During heat setting, a wet porous separator surface is first exposed to high temperature hot air and absorbs a high quantity of heat, and when a heat setting temperature is high, a change in fibril morphology on the surface is very severe. The two-dimensional and three-dimensional phase morphology changes of the separator pores change from an open pore structure to a closed pore structure, and have significant influence on the lithium ion transfer capability in the cycle characteristics.

Accordingly, it is required to manufacture a wet composite separator which has enough technical performance/competitiveness to satisfy the current unfavorable hipot conditions, and may improve the surface morphology of a porous separator and maintain the resistance at a proper level after organic/inorganic coating, and through this, it needs to improve the cycle characteristics of a high power battery.

DISCLOSURE

Technical Problem

The present disclosure is designed to solve the above problem, and therefore, the present disclosure is directed to providing a separator for an electrochemical device in which a composite separator with a porous coating layer has improved structural stability and increased air permeability and ionic conductivity, and an electrochemical device comprising the same.

These and other objects and advantages of the present disclosure will be understood by the following description. Also, it will be apparent that the objects and advantages of the present disclosure may be realized by means or methods stated in the appended claims, and combinations thereof.

Technical Solution

To achieve the above object, according to one aspect of the present disclosure, there is provided a separator for an electrochemical device including a porous polymer film, and a porous coating layer including at least one type of particles of inorganic particles and organic particles and binder polymer, the porous coating layer formed on one surface or both surfaces of the porous polymer film, wherein the porous polymer film has a structure in which multiple fibrils arranged parallel to the surface of the film are stacked in layers, and the fibrils are bound to each other to form a lamellar structure with a size from 130 to 200 nm and tortuosity of the porous polymer film is from 1.60 to 1.90, in which the tortuosity is calculated by the following equation:

$$(\text{Tortuosity } (\tau))^2 = N_M \times \in \quad \text{[Equation]}$$

where $N_M$ denotes the MacMullin number and is a value obtained by dividing $\sigma_0$ by $\sigma_{eff}$, $\sigma_0$ denotes a conductivity value of a pure liquid electrolyte, $\sigma_{eff}$ denotes a conductivity value when combining the separator with the liquid electrolyte, and $\in$ denotes porosity of the separator.

When the porous coating layer is formed on one surface of the porous polymer film, the tortuosity of the porous polymer film may be from 1.60 to 1.75, and when the porous coating layer is formed on both surfaces of the porous polymer film, the tortuosity of the porous polymer film may be from 1.76 to 1.90.

The separator for an electrochemical device may have a tensile strength of 2,000 to 2,500 kg/cm$^2$ in a machine direction and a tensile strength of 2,000 to 2,500 kg/cm$^2$ in a transverse direction.

The porous polymer film may be a porous polyolefin film.

The porous polyolefin film may include polyethylene; polypropylene; polybutylene; polypentene; polyhexene; polyoctene; copolymers of at least one of ethylene, propylene, butene, pentene, 4-methylpentene, hexene and octene, or mixtures thereof.

A thickness of the porous polymer film may be from 5 to 50 μm, and a pore size and a porosity may be from 0.01 to 50 μm and from 10 to 95%, respectively.

The binder polymer may include at least one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide, or mixtures thereof.

The inorganic particles may include inorganic particles having a dielectric constant greater than or equal to 5, inorganic particles capable of transporting lithium ions, or mixtures thereof.

The inorganic particles having a dielectric constant greater than or equal to 5 may include BaTiO$_3$, Pb(Zr,Ti)O$_3$(PZT), Pb$_{1-x}$La$_x$Zr$_{1-y}$Ti$_y$O$_3$(PLZT), PB(Mg$_3$Nb$_{2/3}$)O$_3$—PbTiO$_3$(PMN-PT), hafnia (HfO$_2$), SrTiO$_3$, SnO$_2$, CeO$_2$, MgO, NiO, CaO, ZnO, ZrO$_2$, Y$_2$O$_3$, Al$_2$O$_3$, TiO$_2$, SiC, or mixtures thereof.

The inorganic particles capable of transporting lithium ions may include lithium phosphate (Li$_3$PO$_4$), lithium titanium phosphate (Li$_x$Ti$_y$(PO$_4$)$_3$, 0<x<2, 0<y<3), lithium aluminum titanium phosphate (Li$_x$Al$_y$Ti$_z$(PO$_4$)$_3$, 0<x<2, 0<y<1, 0<z<3), (LiAlTiP)$_x$O$_y$ based glass (0<x<4, 0<y<13), lithium lanthanum titanate (Li$_x$La$_y$TiO$_3$, 0<x<2, 0<y<3), lithium germanium thiophosphate (Li$_x$Ge$_y$P$_z$S$_w$, 0<x<4, 0<y<1, 0<z<1, 0<w<5), lithium nitride (Li$_x$N$_y$, 0<x<4, 0<y<2), SiS$_2$ based glass (Li$_x$Si$_y$S$_z$, 0<x<3, 0<y<2, 0<z<4), P$_2$S$_5$ based glass (Li$_x$P$_y$S$_z$, 0<x<3, 0<y<3, 0<z<7), or mixtures thereof.

The organic particles may include polystyrene, polyethylene, polyimide, melamine-based resin, phenol-based resin, cellulose, modified cellulose, polypropylene, polyester, polyphenylene sulfide, polyaramid, polyamide imide, butylacrylate-ethylmethacrylate copolymers, or mixtures thereof.

Each average grain diameter of the inorganic particles and the organic particles may be independently from 0.001 to 10 μm.

Also, according to one aspect of the present disclosure, there is provided an electrochemical device including a cathode, an anode, and a separator interposed between the cathode and the anode, wherein the separator is the above-described separator for an electrochemical device.

The electrochemical device may be a lithium secondary battery.

The electrochemical device may have a capacity retention ratio of 80 to 95% after 300 cycles at the temperature of 25 to 55° C.

Advantageous Effects

The separator according to an exemplary embodiment of the present disclosure has an increase in the mechanical strength and a reduction in thickness, because a heat-resistant organic/inorganic both-side coating process is performed after film formation of a fabric with an optimal stretching magnification before heat setting, and heat setting is performed at a higher temperature than traditional heat setting, to manufacture a porous polymer film, in which a binding density of fibrils increases by the high quantity of heat.

That is, although a final thickness reduces by heat setting, the weight is unchanged, and because the porosity and the final thickness reduces, the density of the porous separator increases, which is favorable for a hipot process and allows the manufacture of a heat-resistant separator.

As a result, the life of a battery manufactured through the heat setting process of a higher temperature than traditional heat setting is long, and the manufacture of a new separator through improved hipot characteristics may greatly contribute to battery safety.

BRIEF DESCRIPTION OF THE DRAWINGS

The patent application file contains at least one color drawing. Copies of this patent or patent application publication with color drawing will be provided by the USPTO upon request and payment of the necessary fee.

The accompanying drawing illustrates a preferred embodiment of the present disclosure and together with the foregoing disclosure, serves to provide further understanding of the technical spirit of the present disclosure, and thus, the present disclosure is not construed as being limited to the drawing.

MODE FOR CARRYING OUT THE INVENTION

Figure 1:
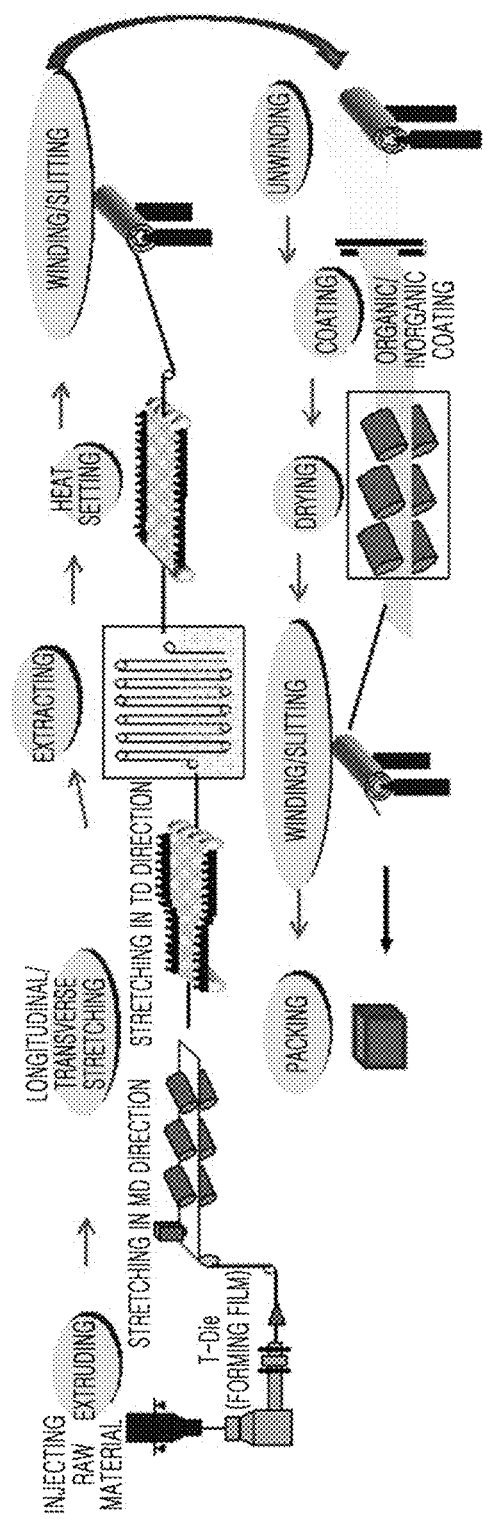
FIG. 1 is a conceptual diagram illustrating a process for manufacturing a separator for an electrochemical device according to a related art.

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

A separator for an electrochemical device according to one aspect of the present disclosure includes a porous polymer film; and a porous coating layer including at least one type of particles of inorganic particles and organic particles and binder polymer, the porous coating layer formed on one surface or both surfaces of the porous polymer film, wherein the porous polymer film has a structure in which multiple fibrils arranged parallel to the surface of the film are stacked in layers, and the fibrils are bound to each other to form a lamellar structure with a size from 130 to 200 nm and tortuosity of the porous polymer film is from 1.60 to 1.90.

The tortuosity is an index indicating how tortuous the pores formed in the separator are, and may be calculated by dividing an actual movement distance of molecules moving in the pores by a straight line distance between the same points. That is, the tortuosity of 1 represents the pores with a movement distance of a straight line, and when the tortuosity is more than 1, the pores is more tortuous.

In this instance, the tortuosity is determined by the following equation.

(Tortuosity $(\tau))^2 = N_M \times \in$       [Equation 1]

In the above equation, $N_M$ denotes the MacMullin number and is a value obtained by dividing $\sigma_0$ by $\sigma_{eff}$, $\sigma_0$ denotes a conductivity value of a pure liquid electrolyte, $\sigma_{eff}$ denotes a conductivity value when combining the separator with the liquid electrolyte, and $\in$ denotes the porosity of the separator.

For example, in one embodiment of the present disclosure, the ionic conductivity of an electrolyte solution itself may be 10.2 mS/cm (25° C.) and the porosity of the separator may be from 38 to 40%.

The smaller tortuosity value of the separator, the shorter permeation time and the higher ionic conductivity of the separator, which is favorable for cycle characteristics of a secondary battery. However, even if the permeation time of the separator is the same or similar, the tortuosity value of the separator may significantly differ and thereby the separator may have different ionic conductivity.

The tortuosity may be from 1.60 to 1.90, more preferably, from 1.60 to 1.80. When the tortuosity is more than 1.90, it is impossible to ensure smooth movement of lithium ions, and when the tortuosity is less than 1.60, the movement resistance of lithium ions greatly reduces and there is a problem with existing cathode/anode design unbalance, resulting in formation of lithium dendrites.

Also, the tortuosity value may be affected by whether the porous coating layer is formed on one surface or both surfaces of the porous polymer film.

According to an exemplary embodiment of the present disclosure, when the porous coating layer is formed on one surface of the porous polymer film, the tortuosity of the porous polymer film may be from 1.60 to 1.75, and when the porous coating layer is formed on both surfaces of the porous polymer film, the tortuosity of the porous polymer film may be from 1.75 to 1.90.

The reason why the tortuosity value has different ranges when the porous coating layer is formed on one surface and when the porous coating layer is formed on both surfaces is that the both-side porous coating layer increases in overall thickness and resistance as compared to the one-side porous coating layer.

Here, the fibril represents aggregates of polymer chains constituting the porous polymer film with an increased binding strength between adjacent molecular chains by stretching and orientating the chains in a lengthwise direction during the manufacture of the film.

As a result, the porous polymer film has a structure in which multiple fibrils arranged parallel to the surface of the film are stacked in layers.

According to an exemplary embodiment of the present disclosure, the fibrils may be bound to each other in the porous polymer film, and more preferably, the fibrils may be bound to each other throughout the entire thickness of the porous polymer film. The fibrils bound throughout the entire thickness of the porous polymer film implies that the fibrils are bound to each other throughout the entire thickness of the porous film on the cross section of the separator of the present disclosure (see FIG. 5d), when compared to binding between fibrils composed of the porous film on the surface of the porous film as seen in FIG. 4d showing the cross section of the separator according to the related art. The interfibrilar binding is one factor of reducing the overall thickness of the porous film, and may function as a factor of improving the air permeability.

The fibrils are bound to each other to form a lamella structure, and in this instance, the size (thickness) of the lamella structure is from 130 to 200 nm, preferably, from 130 to 180 nm, more preferably, from 130 to 160 nm. When the size of the lamella structure meets the range, advantageous effects may be produced, for example, the binding density increases, and the mechanical and thermal performance and the dielectric breakdown voltage (hipot) is improved.

Also, when the thickness of the lamella structure is larger than or equal to 200 nm, the binding density increases by the high heat setting temperature and the porosity reduces rapidly, and thus wettability to the electrolyte solution and the ionic conductivity may greatly reduce.

Generally, as the heat setting temperature is closer to Tm, mobility between the fibrils and the lamella structure increases, so the binding density between the fibrils increases. As the binding density between the fibrils increases, the separator of the present disclosure reduces in overall thickness and thus increases in density and reduces in porosity, and as a consequence, the hipot characteristics may be remarkably improved, as compared to the separator manufactured under the low heat setting temperature condition according to the related art.

On the contrary, to manufacture a separator with a porous coating layer by a traditional wet method, as shown in FIG. 1, a resin composition undergoes extrusion/casting, stretching, and extraction, followed by heat setting, to manufacture a porous polymer film, and subsequently, a process of applying a coating slurry to the porous polymer film and drying is performed. The separator with the porous coating layer manufactured in this way has a fibril structure during stretching after a solid/liquid or liquid/liquid phase separation, and through heat setting, its final structure is determined. That is, because in the traditional method, the porous polymer film is heat set before a porous coating layer is formed, and thus heat applied to the porous polymer film during heat setting is uniform over the whole, and in the obtained separator, a fibril diameter is uniform in a thickness-wise direction of the porous polymer film.

Figure 2:
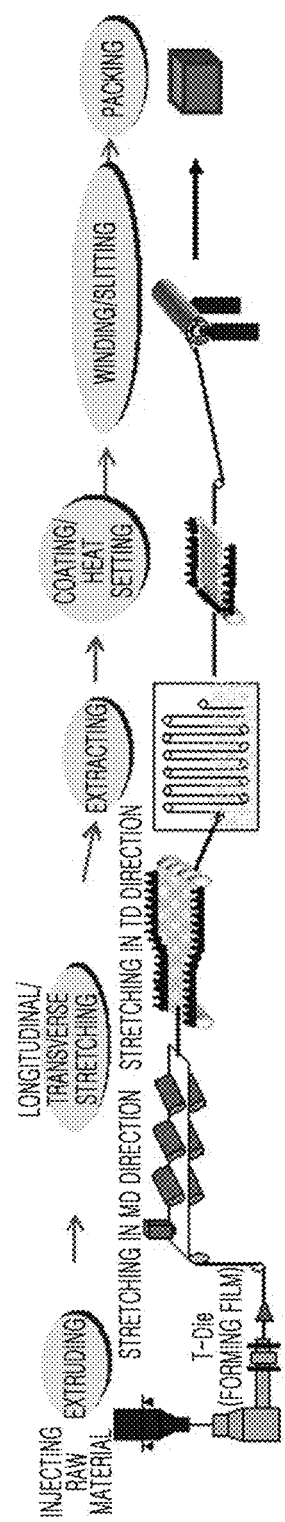
FIG. 2 is a conceptual diagram illustrating a method of manufacturing a separator for an electrochemical device according to an exemplary embodiment of the present disclosure.

Referring to FIG. 2, a method of manufacturing a separator for an electrochemical device according to an exemplary embodiment of the present disclosure includes coating a slurry for forming a porous coating layer on a porous polymer film obtained by extracting a diluent and then performing a heat setting step, and does not include heat setting before the slurry coating step.

As a result, the separator for an electrochemical device according to an exemplary embodiment of the present disclosure already has the porous coating layer on at least one surface of the porous polymer film in the heat setting step, and thus, heat applied to the porous polymer film during heat setting is non-uniform in a thickness-wise direction of the film, and the fibrils of the obtained separator differ in diameter in the thickness-wise direction of the porous polymer film.

The transfer of heat applied to the porous polymer film during heat setting differs based on whether the porous coating layer is formed on one surface or both surfaces, and a final fibril diameter distribution may be influenced thereby.

Figure 3:
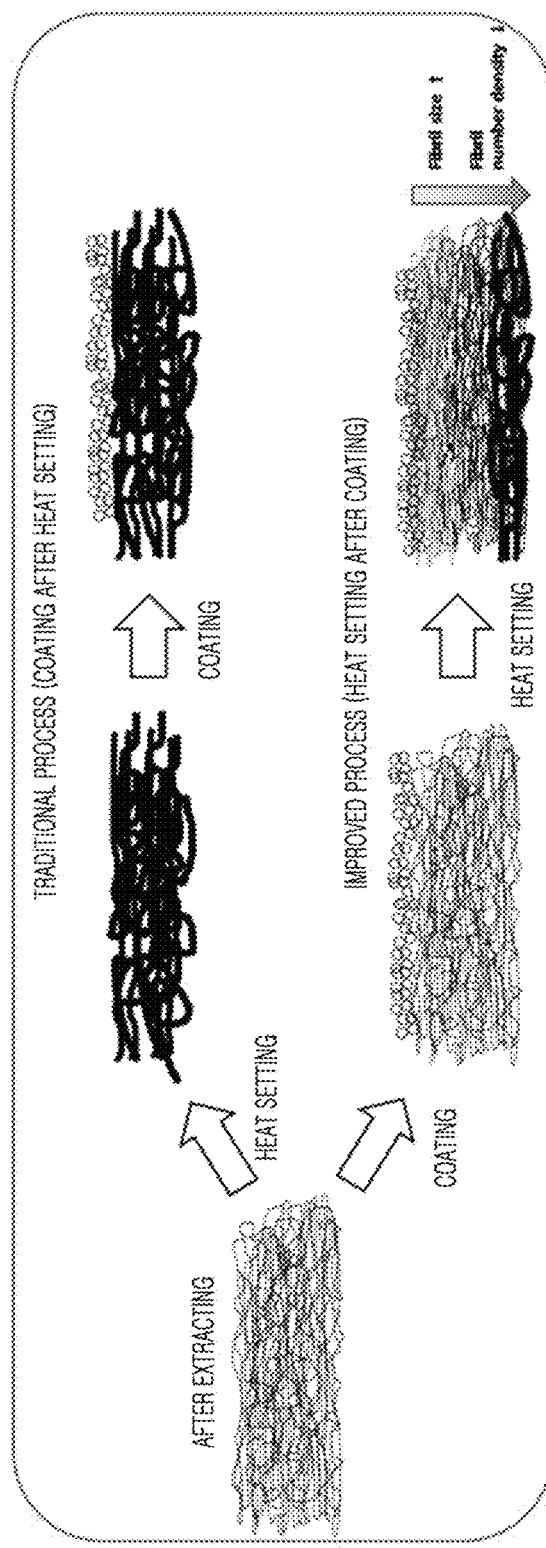
FIG. 3 is a schematic diagram illustrating a comparison of fibril structures between a separator for an electrochemical device by a manufacturing method according to a related art and a separator for an electrochemical device according to an exemplary embodiment of the present disclosure.

First, in the case of the separator with the porous coating layer formed on only one surface of the porous polymer film according to one embodiment of the present disclosure, the effects of direct application and indirect application of the heat setting are presented clearly. In the separator with the porous coating layer formed on only one surface of the porous polymer film, when the porous coating layer is formed and then heat setting is applied, the porous polymer film is indirectly influenced by heat in the presence of the slurry for porous coating and thus the heat transfer is comparatively low. In contrast, when heat setting is directly applied to the porous polymer film on which the porous coating layer is not formed, the porous polymer film is directly influenced by heat and due to partial melting-recrystallization, crystals grow bigger and a fibril diameter increases. As a result, there is a tendency that a gradient occurs such as a gradual increase in a fibril diameter in the thickness-wise direction of the film from the surface of the film where the porous coating layer is formed toward the other surface where the porous coating layer is not formed. In contrast, when slurry coating is performed after heat setting of the porous polymer film like the traditional method, an overall fibril diameter has a uniform value in the thickness-wise direction of the film (See FIG. 3).

That is, the diameter of the fibril disposed on the surface of the film where the porous coating layer is formed is smaller than the diameter of the fibril disposed at the central part in the thickness-wise direction of the film.

Also, in the case of the separator with the porous coating layer formed on both surface of the porous polymer film according to one embodiment of the present disclosure, when slurry coating is performed on both an upper surface and a lower surface of the porous polymer film, during heat setting, the surface where the coating layer is formed is indirectly influenced by heat, but heat is directly transferred to the central part in the thickness-wise direction of the film through the left and right side surfaces of the film where the coating layer is absent. As a result, the diameter of the fibril disposed on the surface of the film where the porous coating layer is formed is smaller than the diameter of the fibril disposed at the central part in the thickness-wise direction of the film.

Also, as discussed above, when the porous coating layer is formed on only one surface of the porous polymer film, the diameter of the fibril disposed on the surface of the film where the porous coating layer is formed is smaller than the diameter of the fibril disposed at the central part in the thickness-wise direction of the film.

According to an exemplary embodiment of the present disclosure, the diameter of the fibril disposed at the side of one surface of the film where the porous coating layer is formed is smaller two to four times, preferably, two to three times than the diameter of the fibril disposed at the central part in the thickness-wise direction of the film.

Also, the diameter of the fibril disposed at the side of one surface of the film where the porous coating layer is formed may be from 0.01 to 0.04 µm, and the diameter of the fibril disposed at the central part in the thickness-wise direction of the film may be from 0.04 to 0.08 µm.

As described in the foregoing, when the porous coating layer is formed on only one surface of the porous polymer film, the diameter of the fibril disposed at the side of one surface of the film where the porous coating layer is formed is smaller than the diameter of the fibril disposed at the side of the other surface of the film where the porous coating layer is not formed.

In this case, the diameter of the fibril disposed at the side of one surface of the film where the porous coating layer is formed is smaller two to seven times, preferably, four to seven times than the diameter of the fibril disposed at the side of the other surface of the film where the porous coating layer is not formed.

Specifically, when the porous coating layer is formed on only one surface of the porous polymer film, the diameter of the fibril disposed at the side of one surface of the film where the porous coating layer is formed may be from 0.01 to 0.07 µm, and the diameter of the fibril disposed at the side of the other surface of the film where the porous coating layer is not formed may be from 0.07 to 0.14 µm.

Also, the fibrilar number density per unit area at the side of one surface of the porous polymer film where the porous coating layer is formed increases and an interfacial contact area with the coating slurry increases, so wettability of the slurry on the polyolefin porous fibril structure may be improved.

Also, in the present disclosure, heat setting may be transmitted slowly to the porous film through the slurry for forming a porous coating layer and may be performed at a higher temperature than traditional heat setting, so the binding density between the fibrils composed of the porous film increases. Thus, the mechanical strength of the separator such as tensile strength may increase. More specifically, the separator according to an exemplary embodiment of the present disclosure may have the tensile strength in a machine direction (MD) from 2,000 to 2,500 kg/cm$^2$ and the tensile strength in a transverse direction (TD) from 2,000 to 2,500 kg/cm$^2$.

The binder polymer is disposed at an interface of adjacent particles and connects the particles to form a porous structure, and a size of the binder polymer disposed at the interface of the particles is from 10 to 100 nm, preferably, from 10 to 50 nm.

According to an exemplary embodiment of the present disclosure, because slurry coating is performed on the porous polymer film dissimilar to the traditional method, heat setting at a high temperature is enabled, and by hot air of high temperature during heat setting, the binder polymer slightly melts and is re-arranged and the binder polymer does not agglomerate. In contrast, according to the traditional method, after slurry coating is performed on the heat set porous polymer film, drying is performed at a relatively low temperature, for example, about 60° C., so only a solvent of the slurry is evaporated and thereby an agglomeration phenomenon of the binder polymer is more noticeable.

Hereinafter, there is provided a detailed description of the density and air permeability of the separator obtained as a result of performing a process of coating the slurry for forming a porous coating layer on at least one surface of the porous polymer film from which a diluent is extracted and a process of heat setting the porous polymer film coated with the slurry according to an exemplary embodiment of the present disclosure.

Figure 5A:
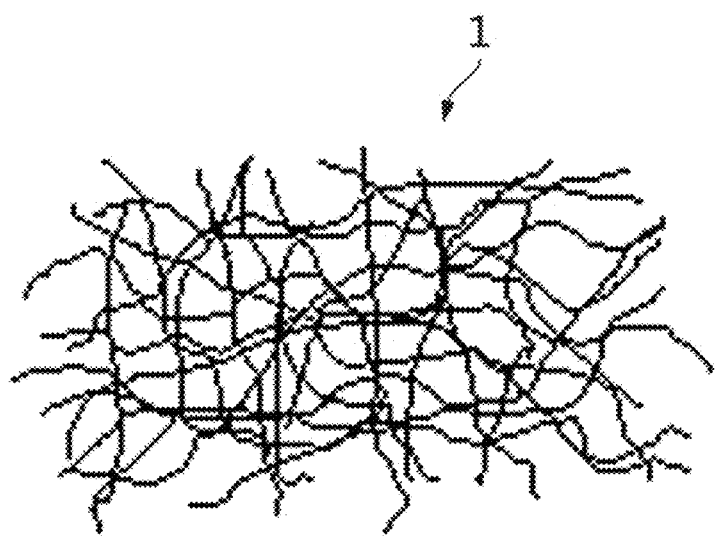
FIGS. 5a through 5c are diagrams illustrating a method of manufacturing a separator according to the present disclosure.
Figure 5B:
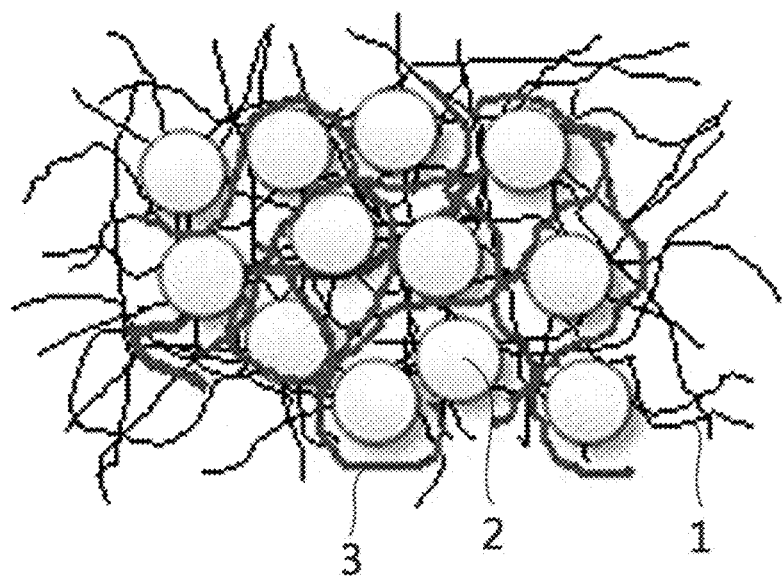
Figure 5C:
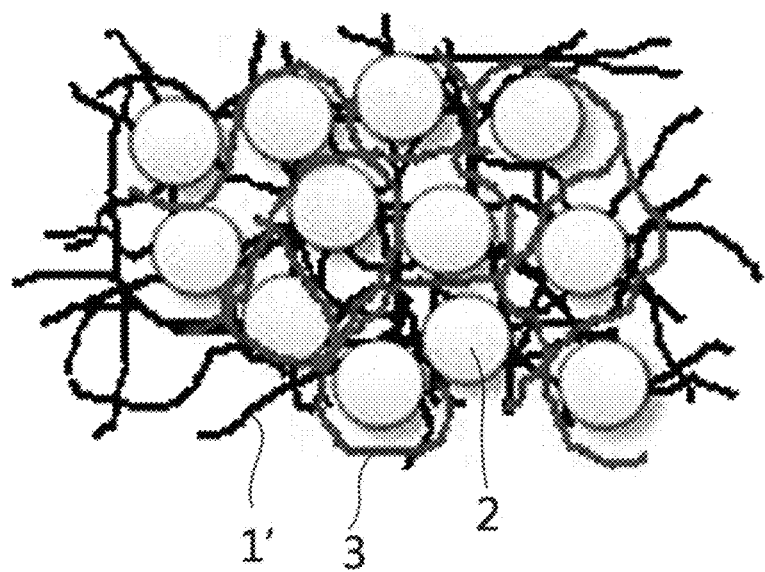

The separator according to an exemplary embodiment of the present disclosure coats a slurry for forming a porous coating layer (FIG. 5b) on a porous polymer film before heat setting treatment (FIG. 5a), and subsequently, performs heat setting (FIG. 5c). In this process, heat setting is slowly performed through the slurry for forming a porous coating layer, and when the slurry for forming a porous coating layer is coated on both surfaces of the porous substrate, heat setting may be performed at a higher temperature than a traditional heat setting temperature, so the binding between the fibrils may be achieved throughout the entire thickness of the porous film (see 1' of FIG. 5d). Thus, of the separator increases in the mechanical strength and air permeability while reducing in thickness. Moreover, because inorganic particles/organic particles may be entangled with the fibrils on the surface of the porous film, the overall thickness of the separator further reduces and the mechanical strength further increases (see FIG. 5b and FIG. 5c).

Figure 4A:
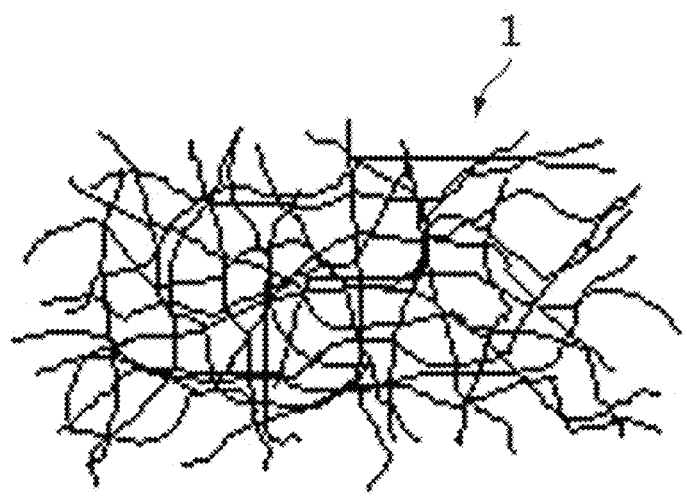
FIGS. 4a through 4c are diagrams illustrating a method of manufacturing a separator according to a related art.
Figure 4B:
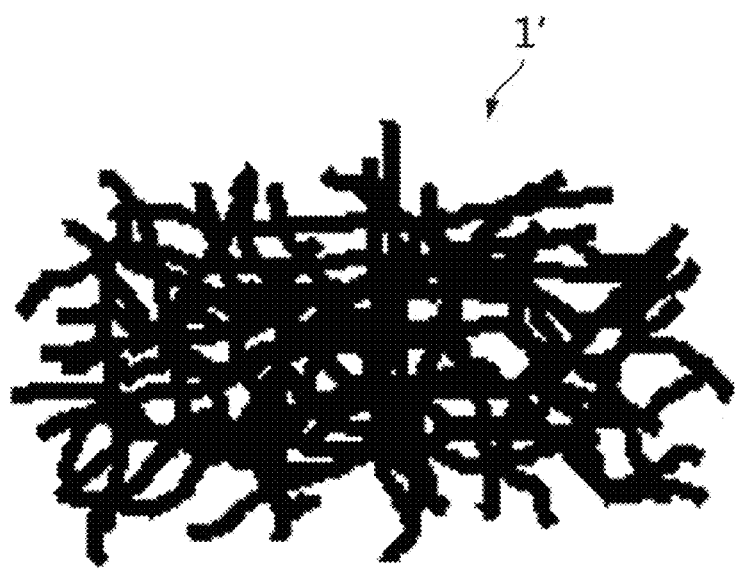
Figure 4C:
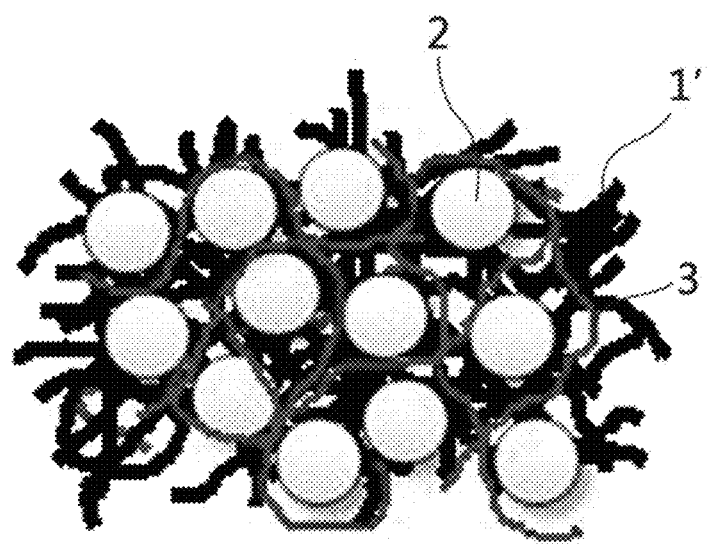
Figure 4D:
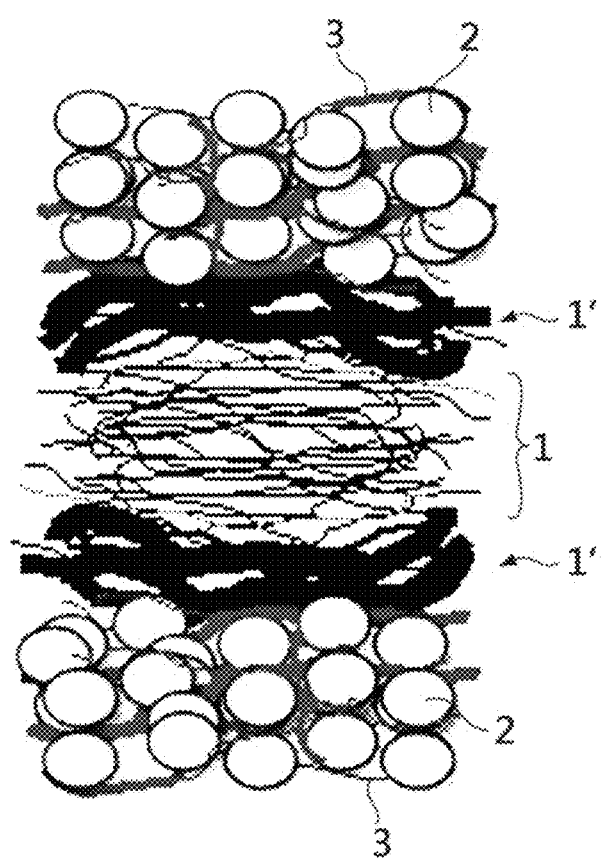
FIG. 4d is a schematic diagram illustrating the manufactured separator according to the related art, as viewed in cross section.
Figure 5D:
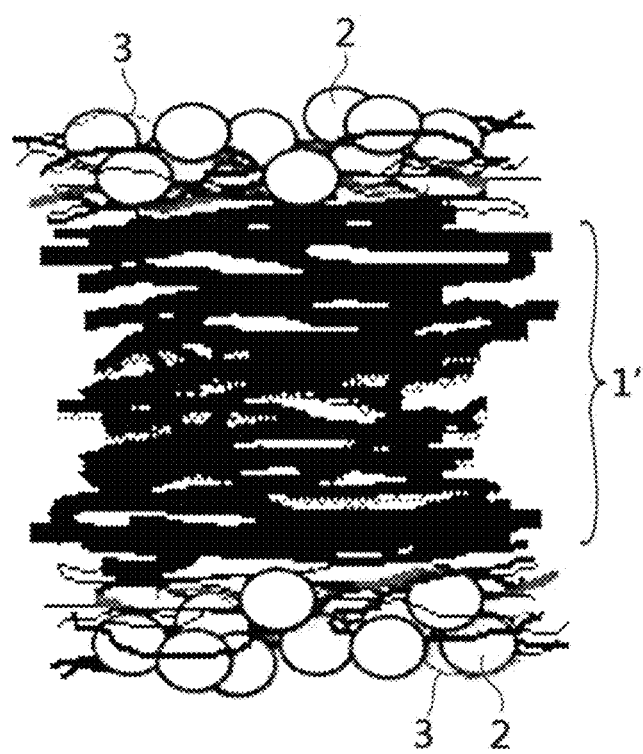
FIG. 5d is a schematic diagram illustrating the manufactured separator according to the present disclosure, as viewed in cross section.

This difference becomes more apparent from a process of manufacturing a separator with a porous coating layer according to a related art, and referring to FIGS. 4a through 4c, conventionally, fibrils constituting a porous polymer film are unbounded before heat setting (see 1 of FIG. 4a), and by heat setting, the fibrils on the surface of the porous film are intensively bound to each other quickly (see 1 and 1' of FIG. 4d). During this process, the pores formed on the surface of the porous film may be damaged or closed, which exercises a negative influence on the air permeability (see FIG. 4b). When a slurry for forming a porous coating layer is coated on the porous film (see FIG. 4c), inorganic particles/organic particles are coated on the surface of the porous film composed of the bound fibrils 1', and as a result, the porous coating layer is formed relatively thick and the separator density is low, in contrast with the present disclosure in which fibrils and inorganic particles/organic particles are entangled.

The porous polymer film is not limited to a particular material if it is commonly used in the art, and for example, includes a polyolefin polymer film.

The polyolefin is not limited to a particular type if it is commonly used in the art. The polyolefin may include, but is not limited to, for example, polyethylene such as high density polyethylene (HDPE), low density polyethylene (LDPE), linear low density polyethylene (LLDPE), ultra high molecular weight polyethylene (UHMWPE); polypropylene; polybutylene; polypentene; polyhexene; polyoctene; copolymers of at least one of ethylene, propylene, butene, pentene, 4-methylpentene, hexene, and octene, or mixtures thereof.

A thickness of the porous polymer film is not particularly limited, but is preferably from 5 to 50 μm, and a pore size and a porosity of the porous polymer film is not particularly limited, but are preferably from 0.001 to 50 μm and from 10 to 99%, respectively.

The porous coating layer may include either inorganic particles or organic particles, or both.

The inorganic particles are not particularly limited if they are electrochemically stable. That is, the inorganic particles that may be used in the present disclosure are not particularly limited if they do not cause oxidation and/or reduction reactions in an operating voltage range (for example, from 0 to 5V for Li/Li$^+$) of an electrochemical device being applied. In particular, when inorganic particles capable of transporting ions are used, ionic conductivity in an electrochemical device increases, contributing to performance improvement. Also, when inorganic particles having a high dielectric constant are used as the inorganic particles, such inorganic particles may contribute to the increase in the degree of dissociation of an electrolyte salt, for example, a lithium salt, in a liquid electrolyte and may improve ionic conductivity of an electrolyte solution.

The inorganic particles include, as a non-limiting example, inorganic particles having a high dielectric constant greater than or equal to 5, preferably, greater than or equal to 10, inorganic particles capable of transporting lithium ions, or mixtures thereof.

The inorganic particles having a dielectric constant greater than or equal to 5 include, as a non-limiting example, BaTiO$_3$, Pb(Zr,Ti)O$_3$(PZT), Pb$_{1-x}$La$_x$Zr$_{1-y}$Ti$_y$O$_3$(PLZT), PB(Mg$_3$Nb$_{2/3}$)O$_3$—PbTiO$_3$(PMN-PT), hafnia (HfO$_2$), SrTiO$_3$, SnO$_2$, CeO$_2$, MgO, NiO, CaO, ZnO, ZrO$_2$, Y$_2$O$_3$, Al$_2$O$_3$, TiO$_2$, SiC, or mixtures thereof In the specification, the 'inorganic particles capable of transporting lithium ions' refer to inorganic particles that contain lithium atoms and have a function of transferring a lithium ion without storing lithium, and the inorganic particles capable of transporting lithium ions includes, as a non-limiting example, lithium phosphate (Li$_3$PO$_4$), lithium titanium phosphate (Li$_x$Ti$_y$(PO$_4$)$_3$, 0<x<2, 0<y<3), lithium aluminum titanium phosphate (Li$_x$Al$_y$Ti$_z$(PO$_4$)$_3$, 0<x<2, 0<y<1, 0<z<3), (LiAlTiP)$_x$O$_y$ based glass (0<x<4, 0<y<13) such as 14Li$_2$O-9Al$_2$O$_3$-38TiO$_2$-39P$_2$O$_5$, lithium lanthanum titanate (Li$_x$La$_y$TiO$_3$, 0<x<2, 0<y<3), lithium germanium thiophosphate (Li$_x$Ge$_y$P$_z$S$_w$, 0<x<4, 0<y<1, 0<z<1, 0<w<5) such as Li$_{3.25}$Ge$_{0.25}$P$_{0.75}$S$_4$, lithium nitride (Li$_x$N$_y$, 0<x<4, 0<y<2) such as Li$_3$N, SiS$_2$ based glass (Li$_x$Si$_y$S$_z$, 0<x<3, 0<y<2, 0<z<4) such as Li$_3$PO$_4$—Li$_2$S—SiS$_2$, P$_2$S$_5$ based glass (Li$_x$P$_y$S$_z$, 0<x<3, 0<y<3, 0<z<7) such as LiI—Li$_2$S—P$_2$S$_5$, or mixtures thereof.

Also, the organic particles are advantageous in aspects of air permeability, thermal shrinking characteristics, and peeling strength, and have excellent binding characteristics with the binder polymer.

The organic particles include, as a non-limiting example, particles consisting of various types of polymers such as polystyrene, polyethylene, polyimide, melamine-based resin, phenol-based resin, cellulose, modified cellulose (carboxymethyl cellulose), polypropylene, polyester (polyethyleneterephthalate, polyethylenenaphthalate, and polybutyleneterephthalate), polyphenylene sulfide, polyaramid, polyamide imide, and butylacrylate-ethylmethacrylate copolymers (for example, crosslinked polymers of butylacrylate and ethylmethacrylate). The organic particles may consist of at least two types of polymers.

A size of the inorganic particles or the organic particles is not limited, but may be each in a range of 0.001 to 10 μm, independently, to form a coating layer with a uniform thickness and have a proper porosity.

The binder polymer is not limited to a particularly type if it functions to connect at least one type of particles of inorganic particles and organic particles and stably hold them, and includes, as a non-limiting example, polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide, singularly or in combination.

A composition ratio of the particles and the binder polymer in the porous coating layer may be, for example, in a range of 50:50 to 99:1, or in a range of 70:30 to 95:5, based on the weight. When the content of the particles to the binder polymer is excessively low, improvements in thermal safety of the separator may be reduced, and due to insufficient formation of interstitial volumes between the particles, the pore size and the porosity are reduced, causing a reduction in final battery performance. In contrast, when the content of the particles to the binder polymer is excessively high, the peeling resistance of the porous coating layer may be reduced.

A method of manufacturing a separator according to an exemplary embodiment of the present disclosure is as follows.

First, a resin composition including polymer resin and a diluent is extruded.

Also, the diluent is not limited to a particular type if it is commonly used in the art. The diluent includes, as a non-limiting example, phthalic acid esters such as dibutyl phthalate, dihexyl phthalate, and dioctyl phthalate; aromatic ethers such as diphenyl ether and benzyl ether; fatty acids having 10 to 20 carbons such as palmitic acid, stearic acid, oleic acid, linoleic acid, and linolenic acid; fatty acid alcohols having 10 to 20 carbons such as palmityl alcohol, stearyl alcohol, oleyl alcohol, and the like; and a fatty acid ester derived from esterification of one or more saturated or unsaturated fatty acid having from 4 to 26 carbon atoms in the fatty acid group and an alcohol having from 1 to 8 hydroxy group(s) and from 1 to 10 carbon atom(s), such as palmitic acid mono-, di- or triester, stearic acid mono-, di- or triester, oleic acid mono-, di- or triester, linoleic acid mono-, di- or triester, and the like.

Also, the diluent may include mixtures of at least two of the above substances.

A weight ratio of the polymer resin to the diluent may be in a range of 80:20 to 10:90, preferably in a range of 70:30 to 20:80, preferably in a range of 50:50 to 30:70. When the weight ratio is more than 80:20, that is, the content of the polymer resin is high, the porosity reduces, the pore size decreases, and interconnection of the pores is insufficient, and thus the permeability significantly reduces, as well as the viscosity of the polymer resin solution increases and the extrusion load increases, which makes processing difficult. When the weight ratio is less than 10:90, that is, the content of the polymer resin is low, the blending of the polymer resin and the diluent reduces and they are not thermodynamically miscible and are extruded in gel form, causing a problem with breakage during stretching and non-uniform thickness, and the manufactured separator may reduce in strength.

To manufacture the composite separator, the present disclosure first mixes a portion or all of the materials using Henschel Mixer, Ribbon Blender, and Tumbler Blender. Subsequently, melt-kneading is performed by a screw extruder such as a single-screw extruder and a twin-screw extruder, a blender, and a mixer, and the mixture is extruded from a T-die or annular die. The blended/extruded melt may be solidified by compressed cooling, and a cooling method includes a direct contact method with a cooling medium such as cool air or cool water and a contact method with a roll or a press cooled by a coolant.

Subsequently, the extruded resin composition is stretched to obtain the polymer resin film. In this instance, as a stretching method, a common method known in the art may be performed, and the stretching method includes, as a non-limiting examples, MD (longitudinal direction) uniaxial stretching by a roll stretcher, TD (transverse direction) uniaxial stretching by a tenter, two step biaxial stretching by a combination of a roll stretcher and a tenter or a combination of a tenter and a tenter, and concurrent biaxial stretching by a concurrent biaxial tenter or inflation molding. Specifically, the stretching of the extruded resin composition may be performed by uniaxial stretching at least once in the MD direction or the TD direction, or biaxial stretching at least once in the MD direction and the TD direction.

A stretch ratio is three times or more each in the longitudinal direction and the transverse direction, preferably, from 5 times to 10 times, and a total stretch ratio (total area magnification is 20 times or more, preferably, from 20 to 80 times.

If the stretch ratio in one direction is less than 3 times, orientation in one direction is insufficient, and at the same time, the property balance between the longitudinal direction and the transverse direction is broken and the tensile strength and puncture strength may reduce. Also, when the total stretch ratio is less than 20 times, non-stretching occurs and pore formation may not be achieved, and when the total stretch ratio is more than 80 times, breakage occurs during stretching and shrinkage of a final film increases.

In this instance, a stretching temperature may change based on a melting point of the polymer resin used and a concentration and a type of the diluent, and preferably, the stretching temperature is selected within a temperature range in which 30 to 80 wt % of crystalline domains of the polymer resin in the film melt.

When the stretching temperature is selected within a temperature range lower than the temperature at which 30 wt % of crystalline domains of the polymer resin in the sheet molding product melt, softness of the film is low, stretching characteristics are poor, and the likelihood that breakage will occur during stretching is high, and at the same time, non-stretching occurs. In contrast, when the stretching temperature is selected within a temperature range higher than the temperature at which 80 wt % of crystalline domains melt, stretching is easy and non-stretching occurs less frequently, but due to partial over-stretching, a thickness deviation occurs, and an orientation effect of resin are low, and thus, the properties significantly reduce. In this instance, an extent to which the crystalline domains melt based on temperature may be obtained from differential scanning calorimeter (DSC) analysis of the film molding product.

Subsequently, the diluent is extracted from the stretched film to obtain the porous polymer film. Specifically, the diluent is extracted from the stretched film using an organic solvent, and is then dried.

As the extraction solvent used in extracting the diluent, it is preferred to use an extraction solvent which serves as a poor solvent for the polymer resin and a good solvent for the diluent, and has a boiling point lower than the melting point of the polymer resin and thus is dried quickly. The extraction solvent includes, as a non-limiting example, hydrocarbons such as n-hexane or cyclohexane, halogenated hydrocarbons such as methylene chloride, 1,1,1-trichloroethane and fluorocarbon, alcohols such as ethanol or isopropanol, and ketones such as acetone or 2-butanone.

As the extraction method, all general solvent extraction methods including an immersion method, a solvent spray method, and an ultrasonic method may be used, singularly or in combination. In the extraction, the content of the remaining diluent is preferably less than or equal to 1 wt %. When the content of the remaining diluent is more than 1 wt %, the properties reduce and the permeability of the porous membrane reduces. An amount of the remaining diluent may be influenced by an extraction temperature and an extraction time, and to increase the solubility of the diluent and the organic solvent, a high extraction temperature is good, but considering the safety problem with the boiling of the organic solvent, the extraction temperature is preferably less than or equal to 40° C. When the extraction temperature is less than or equal to a freezing point of the diluent, extraction efficiency greatly drops, and accordingly, the extraction temperature should be certainly higher than the freezing point of the diluent.

Also, the extraction time may change based on a thickness of the porous polymer film being manufactured, but when the thickness is from 10 to 30 μm, 2-4 minutes are proper.

The thickness of the porous polymer film obtained as above is not particularly limited, but is preferably from 5 to 50 μm, and the pore size and the porosity of the porous substrate is not particularly limited, but are preferably from 0.001 to 50 μm and from 10 to 99%, respectively.

Subsequently, the slurry for forming a porous coating layer is coated on at least one surface of the porous polymer film. To this end, first, the slurry for forming a porous coating layer is prepared, and the slurry is prepared by dispersing, in a solvent, at least one type of particles of inorganic particles and organic particles together with binder polymer. That is, the slurry may include either inorganic particles or organic particles, or both.

As the solvent included in the slurry, it is preferred to use a solvent which allows uniform mixing of the particles and the binder polymer and subsequently can be removed at ease. Non-limiting examples of available solvents may include acetone, tetrahydrofuran, methylene chloride, chloroform, dimethylformamide, N-methyl-2-pyrrolidone (NMP), cyclohexane, water, or mixtures thereof.

The slurry for forming a porous coating layer is coated on at least one surface of the porous polyolefin film, and a specific method for coating may use a common coating method known in the art, and various methods may be used, for example, dip coating, die coating, roll coating, comma coating, or mixtures thereof. Also, the porous coating layer may be selectively formed on both surfaces or only one surface of the porous polyolefin film.

Subsequently, the porous polyolefin film coated with the slurry is heat-set to obtain the composite separator with the porous coating layer.

The heat setting is a process which fixes the film and applies heat, and although the film tends to shrink, forcibly holds the film to remove residual stress. As a heat setting temperature increases, the shrinkage preferably reduces, but when the heat setting temperature is excessively high, the polyolefin film partially melts and closes the formed micro pores and the permeability may reduce.

Dissimilar to the traditional process that stretches to the polyolefin film, extracts the diluent, and performs heat setting, the present disclosure stretches to the polyolefin film, extracts the diluent, coats with the slurry for forming a porous coating layer, and performs heat setting, so heat setting is performed on the coated slurry rather than the polyolefin film, and heat is not directly applied to the polyolefin film.

Thus, although heat setting is performed at higher temperature than the method according to the related art, melting of the polyolefin film may be suppressed. Also, because the quantity of heat directly applied to the polyolefin film is small, as opposed to fibrils of the heat-set polyolefin film according to the related art, fibrils of the polyethylene substrate adjacent to the porous coating layer are formed thin. Thus, the fibrilar number density per unit area of the porous polymer film surface adjacent to the porous coating layer increases, an interfacial contact area with the coating slurry increases, and when heat setting is performed in a temperature range higher than a glass transition temperature ($T_g$) or a melting point ($T_m$) of the coating slurry, wettability of the slurry on the fibrilar structure of the porous polyolefin film may be improved.

The heat setting temperature is preferably adjusted to Tm −1° C. or less, and in this instance, Tm corresponds to the melting point of the polyolefin.

According to an exemplary embodiment of the present disclosure, when polyolefin, to be specific, polyethylene is used as the polymer resin, the heat setting temperature may be from 131 to 134° C., preferably, from 131 to 133° C., and when the heat setting temperature satisfies this range, the binding strength (peeling strength) of the porous coating layer and the porous polymer film may be improved, the structural stability may be ensured, and air permeability and specific-resistance may be lowered.

Also, the heat setting may be performed using a heat source facing in a perpendicular direction to the surface of the slurry coated on the porous polymer film. As the heat source, hot air of a hot air dryer may be used, but a variety of other examples may be used if it can provide the effect of heat setting.

In the traditional method of drying at a relatively low temperature after coating, the binder polymer in the coated slurry, in particular, crystalline polymer with poor solubility, is distributed, but not dispersed well, in the coating layer after solvent volatilization.

In contrast, according to an exemplary embodiment of the present disclosure, in the heat setting step, because the heat source of high temperature is applied in the perpendicular direction to the surface of the slurry coated on the porous polymer film, crystalline binder polymer between the particles or crystalline binder polymer incompletely bound with the particles is re-disposed by the recrystallization exerted by the high temperature heat source and the resistance by the binder polymer, and thus, the resistance caused by non-uniform dispersion in the coating layer may significantly reduce.

A thickness of the porous coating layer formed as above is not particularly limited, but may be in a range of 0.01 to 20 µm, and a pore size and a porosity is not particularly limited, but the pores size may be in a range of 0.001 to 10 µm and the porosity may be in a range of 10 to 99%. The pore size and the porosity mainly depends on the size of the particles used, and when particles with a grain diameter, for example, less than or equal to 1 µm are used, the resulting pores show approximately 1 µm or less in size.

In a state that the particles are packed in the porous coating layer and come into contact with each other, the particles are bound with each other by the binder polymer, thereby interstitial volumes are formed between the particles and the interstitial volumes between the particles become a void space to form pores.

That is, the binder polymer allows the particles to be adhered to each other to maintain the bound state of the particles, and for example, the binder polymer connects and holds the particles. Also, the pores of the porous coating layer are pores formed with the interstitial volumes between the particles that define voids, and this is a space defined by the particles substantially in surface contact in a closed packed or densely packed structure by the particles. This pore structure is filled with an electrolyte solution to be injected later, and the filled electrolyte solution may provide a channel for movement of lithium ions essential to operate a battery through the pores of the porous coating layer.

As described in the foregoing, the method of manufacturing a separator according to an exemplary embodiment of the present disclosure does not need a heat setting process, a winding and slitting process, and an unwinding process after the diluent extraction process and before the coating process, as opposed to the manufacturing method according to the related art as shown in FIG. 1.

Here, the winding process represents a step of winding, on a roller, the porous polymer film obtained through the extrusion/stretching/extraction steps or the composite separator obtained through slurry coating, and the slitting process represents a step of cutting an unnecessary part off from both ends when winding the porous polymer film or the composite separator.

The method according to the related art performs the winding and slitting process after heat setting of the porous polymer film, and for slurry coating, needs to unwind the wound film, and after the slurry coating and drying process, performs the winding and slitting process again, finally followed by the packing step.

In this instance, according to an exemplary embodiment of the present disclosure, a number of winding and slitting processes reduces to one time instead of two times as in the method according to the related art, and a loss of a portion of the porous polymer film caused by the winding and slitting process is prevented, resulting in yield increase.

Also, because of omission of an unwinding process performed before the slurry coating step after the winding and slitting process in the method according to the related art, the space utility and process costs may be saved. Further, because a slitting process before the slurry coating step or a winding/unwinding process is not performed, ultra-wide and large-area coating is enabled, occurrence of defects in a final separator such as wrinkles, pinholes, and scratches remarkably decreases, and an uncoated area reduces.

Also, instead of two separate thermal treatment processes in the method according to the related art such as the heat setting process after the diluent extraction and the drying process after slurry coating, through improvements to a single thermal treatment process of the heat setting process after slurry coating, a single heat setting oven may be used rather than two separate ovens such as a dry oven and a heat setting oven, and the space utility and cost savings may be achieved.

According to one aspect of the present disclosure, there is provided an electrochemical device including a cathode, an anode, and a separator interposed between the cathode and the anode, in which the separator is the above-described separator for an electrochemical device.

The electrochemical device may be manufactured by a common method known in the art, and for example, may be manufactured by assembling the cathode and the anode with the separator interposed between the cathode and the anode and pouring an electrolyte solution.

The electrode to be applied together with the separator is not particularly limited, and may be manufactured by binding an electrode active material to an electrode current collector by a common method known in the art.

Of the electrode active material, a cathode active material includes, as a non-limiting example, a general cathode active material that may be conventionally used in a cathode of an electrochemical device, and particularly, it is preferred to use lithium manganese oxide, lithium cobalt oxide, lithium nickel oxide, lithium iron oxide, or lithium composite oxides thereof. An anode active material includes, as a non-limiting example, a general anode active material that may be conventionally used in an anode of an electrochemical device, and particularly, a lithium adsorption material is preferred such as a lithium metal or a lithium alloy, carbon, petroleum coke, activated carbon, graphite, or other carbons.

A non-limiting example of a cathode current collector includes a foil made from aluminum, nickel, or a combination thereof, and a non-limiting example of an anode current collector includes a foil made from copper, gold, nickel or copper alloy or combinations thereof.

The electrolyte solution that may be used in an exemplary embodiment of the present disclosure may be an electrolyte solution in which a salt is dissolved or dissociated in an organic solvent, the salt having a structure represented by, for example, $A^+B^-$ wherein $A^+$ is an alkali metal cation such as $Li^+$, $Na^+$, $K^+$, or combinations thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combinations thereof, and the organic solvent including, but is not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or mixtures thereof.

The pouring of the electrolyte solution may be performed in any suitable step of a battery manufacturing process based on a manufacturing process and required physical properties of a final product. That is, the pouring of the electrolyte solution may be applied before battery assembly of an electrochemical device or in the final step of battery assembly.

A process of applying the separator according to an exemplary embodiment of the present disclosure to a battery includes a general process such as a winding process, as well as a lamination/stacking process and a folding process of the separator and the electrode.

The electrochemical device may have a capacity retention ratio from 80 to 95%, more preferably, from 83 to 90%, after 300 cycles at the temperature of 25 to 55° C. This comes from the fact that because the separator provided in the electrochemical device of the present disclosure is manufactured by heat setting treatment at a higher temperature than the related art, fibrils in the porous polymer film of the separator are bound to each other, so the binding density increases and the air permeability and specific resistance reduces, and thus the binding strength (peeling strength) between the porous coating layer and the porous polymer film is improved and the structural stability is ensured.

Hereinafter, the present disclosure will be described in detail through examples to help understanding. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

EXAMPLE 1-1

Manufacture of Separator

High density polyethylene with a weight average molecular weight of 500,000 as polyolefin and liquid paraffin with a kinematic viscosity of 68.00 cSt as a diluent were extruded using a weight ratio of 35:65 at the temperature of 210° C. Stretching was performed at a stretching temperature of 115° C., and a stretch ratio of seven times each in a longitudinal direction and a transverse direction. Subsequently, the diluent, i.e., the liquid paraffin was extracted using methylene chloride as an extraction solvent under the condition of 2 m/min to obtain a porous polyolefin film with an average pore size of 0.04 μm.

Subsequently, $Al_2O_3$ particles with an average grain diameter of 0.5 μm/cyanoethylpolyvinylalcohol (Cyano resin CR-V, Shin-Etsu Chemical, Ltd.)/PVDF-HFP5 (LBG2, Arkema, Inc.)/acetone was mixed at a weight ratio of 18.0/0.3/1.7/80 to prepare a slurry for forming a porous layer.

The slurry was coated in a thickness of 3.5 μm on one surface of the porous polyolefin film having undergone the diluent extraction process, and subsequently, heat setting was performed at 132.5° C. and 5 m/min, to manufacture a 14.5 μm-thick separator with the porous coating layer. The porous coating layer of the separator has an average pore size of 0.4 μm and an average porosity of 58%.

EXAMPLE 1-2

Manufacture of Separator

A separator was manufactured by the same method as Example 1-1, except that the slurry was coated in a thickness of 4.0 pin on both surfaces and a thickness of the separator is 19.0 μm. The porous coating layer of the separator has an average pore size of 0.4 μm and an average porosity of 55%.

EXAMPLE 1-3

Manufacture of Cylindrical (18650) Secondary Battery

Ethylene carbonate, propylene carbonate, and methyl ethyl carbonate compounds were used at a composition ratio of 20/10/70 based on a volumetric ratio. Subsequently, LiPF6 as a lithium salt was added to a concentration of 1.0M to obtain a non-electrolyte solution.

With the use of a ternary system cathode material (Li $Ni_{1/3}CO_{1/3}Mn_{1/3}O_2$) as a cathode active material, a cathode mixture including 1.3 wt % of Super-P (registered trademark) as a conductive material, 1.8 wt % of PVDF(KF1100 binder), and 0.4 wt % of Li2CO3(lithium carbonate) as an additive was added to a solvent NMP(N-methyl-2-pyrrolidone) to prepare a cathode slurry with solids of 75%, which was then coated on an aluminum current collector to manufacture a cathode.

With the use of graphite as an anode active material, 0.7 wt % of Super-P (registered trademark) as a conductive material, approximately 0.9 wt % of a SBR binder, and approximately 0.9 wt % of a CMC dispersant were added to DI-Water together, to prepare an anode slurry with solids of 51%, which was then coated on a copper current collector to manufacture an anode.

The cathode and anode manufactured as above were impregnated with a non-electrolyte solution with the separator manufactured in Example 1-1 interposed between the cathode and the anode, to manufacture a cylindrical (18650) secondary battery with a capacity of 2, 800 mAh.

EXAMPLE 1-4

Manufacture of Cylindrical (18650) Secondary Battery

An electrochemical device was manufactured in the same manner as Example 1-3, except that the separator of Example 1-2 was used as a separator.

EXAMPLE 2-1

Manufacture of Separator

A separator for an electrochemical device was manufactured by the same method as Example 1-1, except that a slurry for forming a porous layer was prepared using organic particles (Zeon, FX9022) with an average grain diameter of 0.5 μm composed of a crosslinked polymer compound of butylacrylate and ethylmethacrylate, polybutylacrylate as binder polymer, carboxymethyl cellulose (CMC) as a dispersant, and water as a solvent at a weight ratio of 18/1.5/0.5/80. The porous coating layer of the separator has an average pore size of 0.4 μm and an average porosity of 58%.

EXAMPLE 2-2

Manufacture of Separator

A separator was manufactured by the same method as Example 2-1, except that the slurry was coated in a thickness of 4.0 μm on both surfaces and a thickness of the separator is 19.0 μm. The porous coating layer of the separator has an average pore size of 0.4 μm and an average porosity of 55%.

EXAMPLE 2-3

Manufacture of Cylindrical (18650) Secondary Battery

An electrochemical device was manufactured in the same manner as Example 1-3, except that the separator of Example 2-1 was used as a separator.

EXAMPLE 2-4

Manufacture of Cylindrical (18650) Secondary Battery

An electrochemical device was manufactured in the same manner as Example 1-3, except that the separator of Example 2-2 was used as a separator.

COMPARATIVE EXAMPLE 1-1

Manufacture of Separator

The same method as Example 1 was performed up to a process of extracting a diluent from a polyethylene film. That is, high density polyethylene with a weight average molecular weight of 500,000 as polyolefin and liquid paraffin with a kinematic viscosity of 68.00 cSt were extruded using a weight ratio of 35:65 at the temperature of 210° C. Subsequently, stretching was performed at a stretching temperature of 115° C., and a stretch ratio of seven times each in a longitudinal direction and a transverse direction. Subsequently, after the diluent was extracted, heat setting was performed at 130° C. and 5 m/min, to obtain a porous polyolefin film, and this was prepared as a separator.

COMPARATIVE EXAMPLE 1-2

Manufacture of Separator

A slurry for forming a porous coating layer including $Al_2O_3$ particles/cyanoethyl polyvinylalcohol/PVDF-HFP/acetone at a weight composition ratio of 13.5/0.225/1.275/85 was prepared.

The slurry for forming a porous coating layer was coated in a thickness of 3.5 μm on one surface of the porous polyolefin film obtained in Comparative example 1-1, and then dried at 60° C. and 5 m/min, to manufacture a 14.5 μm-thick separator.

COMPARATIVE EXAMPLE 1-3

Manufacture of Separator

A separator was manufactured by the same method as Comparative example 1-2, except that the slurry was coated in a thickness of 4.0 μm on both surface and a thickness of the separator was 19.0 μm.

COMPARATIVE EXAMPLE 1-4

Manufacture of Cylindrical (18650) Secondary Battery

An electrochemical device was manufactured in the same manner as Example 1-3, except that the separator of Comparative example 1-2 was used as a separator.

COMPARATIVE EXAMPLE 1-5

Manufacture of Cylindrical (18650) Secondary Battery

An electrochemical device was manufactured in the same manner as Example 1-3, except that the separator of Comparative example 1-3 was used as a separator.

COMPARATIVE EXAMPLE 2-1

Manufacture of Separator

A porous polyolefin film was obtained by the same method as Comparative example 1-1, except that heat setting was performed at 132.5° C. and 5 m/min, and this was prepared as a separator.

COMPARATIVE EXAMPLE 2-2

Manufacture of Separator

A slurry for forming a porous coating layer including $Al_2O_3$ particles/cyanoethyl polyvinylalcohol/PVDF-HFP/acetone at a weight composition ratio of 13.5/0.225/1.275/85 was prepared.

The slurry for forming a porous coating layer was coated in a thickness of 3.5 μm on one surface of the porous polyolefin film obtained in Comparative example 2-1, and then dried at 60° C. and 5 m/min, to manufacture a 14.5 μm-thick separator.

COMPARATIVE EXAMPLE 2-3

Manufacture of Separator

A separator was manufactured by the same method as Comparative example 2-2, except that the slurry was coated in a thickness of 4.0 μm on both surface and a thickness of the separator was 19.0 μm.

COMPARATIVE EXAMPLE 2-4

Manufacture of Cylindrical (18650) Secondary Battery

An electrochemical device was manufactured in the same manner as Example 1-3, except that the separator of Comparative example 2-2 was used as a separator.

COMPARATIVE EXAMPLE 2-5

Manufacture of Cylindrical (18650) Secondary Battery

An electrochemical device was manufactured in the same manner as Example 1-3, except that the separator of Comparative example 2-3 was used as a separator.

COMPARATIVE EXAMPLE 3-1

Manufacture of Separator

A separator for an electrochemical device was manufactured by the same method as Comparative example 1-2, except that a slurry for forming a porous coating layer was prepared using organic particles (Zeon, FX9022) with an average grain diameter of 0.5 μm composed of a crosslinked polymer compound of butylacrylate and ethylmethacrylate, polybutylacrylate as binder polymer, carboxymethyl cellulose (CMC) as a dispersant, and water as a solvent at a weight ratio of 18/1.5/0.5/80.

COMPARATIVE EXAMPLE 3-2

Manufacture of Separator

A separator for an electrochemical device was manufactured by the same method as Comparative example 1-3, except that a slurry for forming a porous coating layer was prepared using organic particles (Zeon, FX9022) with an average grain diameter of 0.5 μm composed of a crosslinked polymer compound of butylacrylate and ethylmethacrylate, polybutylacrylate as binder polymer, carboxymethyl cellulose (CMC) as a dispersant, and water as a solvent at a weight ratio of 18/1.5/0.5/80.

COMPARATIVE EXAMPLE 3-3

Manufacture of Cylindrical (18650) Secondary Battery

An electrochemical device was manufactured in the same manner as Example 1-3, except that the separator of Comparative example 3-1 was used as a separator.

COMPARATIVE EXAMPLE 3-4

Manufacture of Cylindrical (18650) Secondary Battery

An electrochemical device was manufactured in the same manner as Example 1-3, except that the separator of Comparative example 3-2 was used as a separator.

COMPARATIVE EXAMPLE 4-1

Manufacture of Separator

A separator for an electrochemical device was manufactured by the same method as Comparative example 2-2, except that a slurry for forming a porous coating layer was prepared using organic particles (Zeon, FX9022) with an average grain diameter of 0.5 μm composed of a crosslinked polymer compound of butylacrylate and ethylmethacrylate, polybutylacrylate as binder polymer, carboxymethyl cellulose (CMC) as a dispersant, and water as a solvent at a weight ratio of 18/1.5/0.5/80.

COMPARATIVE EXAMPLE 4-2

Manufacture of Separator

A separator for an electrochemical device was manufactured by the same method as Comparative example 2-3, except that a slurry for forming a porous coating layer was prepared using organic particles (Zeon, FX9022) with an average grain diameter of 0.5 μm composed of a crosslinked polymer compound of butylacrylate and ethylmethacrylate, polybutylacrylate as binder polymer, carboxymethyl cellulose (CMC) as a dispersant, and water as a solvent at a weight ratio of 18/1.5/0.5/80.

COMPARATIVE EXAMPLE 4-3

Manufacture of Cylindrical (18650) Secondary Battery

An electrochemical device was manufactured in the same manner as Example 1-3, except that the separator of Comparative example 4-1 was used as a separator.

COMPARATIVE EXAMPLE 4-4

Manufacture of Cylindrical (18650) Secondary Battery

An electrochemical device was manufactured in the same manner as Example 1-3, except that the separator of Comparative example 4-2 was used as a separator.

EVALUATION EXAMPLE 1

Evaluation of Separator

Each separator manufactured in the above Examples 1-1, 1-2, 2-1 and 2-2 and Comparative examples 1-1, 1-2, 1-3, 2-1, 2-2, 2-3, 3-1, 3-2, 4-1 and 4-2 was measured to determine a thickness, a permeation time, a porosity, an average pore size, tensile strength in MD and TD directions, a thermal shrinkage, a dielectric breakdown voltage, tortuosity, and a size of a lamellar structure, and their results are shown in the following Table 1 and Table 2.

In this instance, the thermal shrinkage was measured under the condition of 120° C./1 hr for a fabric and a one-side composite membrane and 150° C./0.5 hr for a both-side composite membrane.

The tortuosity was measured using the following equation.

$$(\text{Tortuosity } (\tau))^2 = N_M \times \epsilon \quad \text{[Equation]}$$

In the above equation, $N_M$ denotes the MacMullin number and is a value obtained by dividing $\sigma_0$ by $\sigma_{\mathit{eff}}$, $\sigma_0$ denotes a conductivity value of a pure liquid electrolyte, $\sigma_{\mathit{eff}}$ denotes a conductivity value when combining the separator with the liquid electrolyte, and ϵ denotes the porosity of the separator In the following tables 1 and 2, the tortuosity was calculated with the ionic conductivity of the electrolyte solution of 10.2 mS/cm (25° C.) and the porosity of each separator.

Also, the size of the lamellar structure was observed and measured using a scanning electron microscope (SEM) instrument (Hitachi S-4800) after peeling off the porous coating layer of the separator using a tape.

Figure 6A:
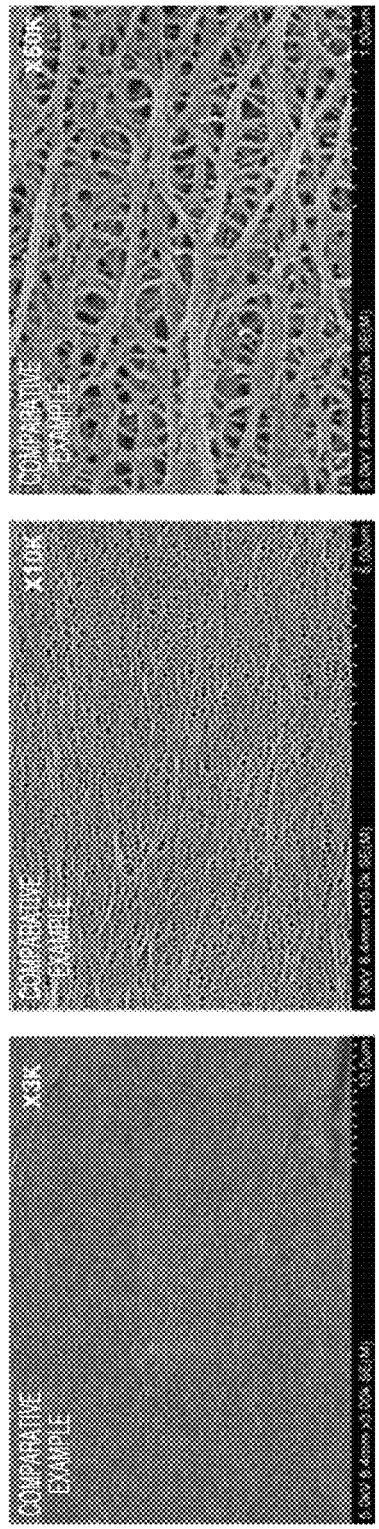
FIGS. 6a and 6b are scanning electron microscope (SEM) images of the surface of a porous polymer film of Comparative example 1-1 and a porous polymer film of Example 1-1.
Figure 6B:
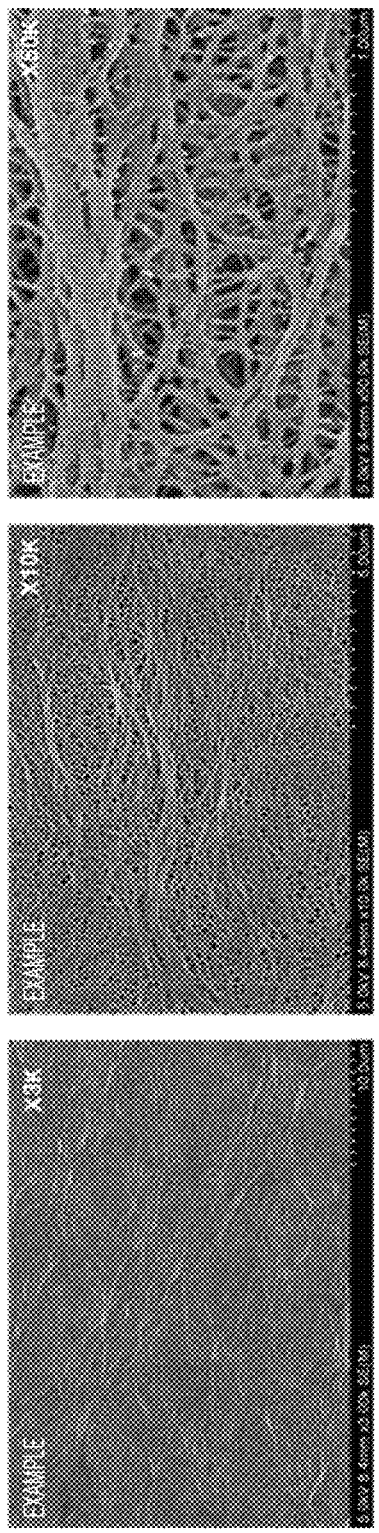

Specifically, the surface of the remaining porous polymer film after peeling off the porous coating layer from the separators of Example 1-1 and Comparative example 1-1 using a tape was observed using a SEM instrument, and their results are shown in FIGS. 6a and 6b.

The dielectric breakdown voltage (hipot measurement) was measured at 100V/sec and a current limit of 0.5 mA under the on-ramp condition in a DC mode.

EVALUATION EXAMPLE 2

Evaluation of Cylindrical (18650) Cell

Using the coin cells manufactured in Examples 1-3, 1-4, 2-3 and 2-4 and Comparative examples 1-4, 1-5, 2-4, 2-5, 3-3, 3-4, 4-3 and 4-4 a capacity retention ratio to design capacity was measured and its results are shown in the following Table 1 and Table 2.

In this instance, the battery was charged and discharged at a charge rate of 0.8 C and a discharge rate of 0.5 C per each temperature, and then a ratio of final rate characteristics after 300 cycles to the rate after the first cycle was evaluated as the capacity retention ratio to design capacity.

TABLE 1

| | | Traditional process (heat setting → coating) | | | Traditional process (heat setting → coating) | | | Improved process (coating → heat setting) | |
|---|---|---|---|---|---|---|---|---|---|
| Classification | | Comparative example 1-1 Fabric | Comparative example 1-2 One-side composite membrane | Comparative example 1-3 Both-side composite membrane | Comparative example 2-1 Fabric | Comparative example 2-2 One-side composite membrane | Comparative example 2-3 Both-side composite membrane | Example 1-1 One-side composite membrane | Example 1-2 Both-side composite membrane |
| Heat setting temperature | °C. | 130 | — | — | 132.5 | — | — | 132.5 | |
| Thickness | μm | 11.0 | 14.5 | 19.0 | 11.0 | 14.5 | 19.0 | 14.5 | 19.0 |
| Permeation time | Sec/100 ml | 160 | 230 | 380 | 380 | 440 | 610 | 190 | 300 |
| Separator porosity | % | 38 | 38 | 38 | 35 | 35 | 35 | 35 | 35 |
| Tensile Str. MD | Kg/cm2 | 1700 | 1700 | 1700 | 2350 | 2350 | 2350 | 2300 | 2300 |
| TD | | 1400 | 1400 | 1400 | 1980 | 1980 | 1980 | 2000 | 2000 |
| Thermal shrinkage MD | % | <15 | <8 | <12 | <12 | <5 | <8 | <6 | <8 |
| TD | | <10 | <4 | <10 | <7 | <3 | <4 | <4 | <5 |
| Dielectric breakdown voltage | KV | 1.2~1.4 | 1.5~1.8 | 2.0~2.4 | 1.3~1.6 | 1.6~2.0 | 2.5~3.0 | 1.6~2.0 | 2.5~3.0 |
| Tortuosity | τ | 1.55 | 1.85 | 2.23 | 1.69 | 2.10 | 2.85 | 1.60 | 1.90 |
| Size of lamellar structure | nm | 110 | 110 | 110 | 160 | 160 | 160 | 150 | 150 |
| Capacity retention ratio to design capacity 25° C. After 300 cycles | % | — | 85 | 77 | — | 59 | 49 | 88 | 83 |
| 55° C. | | — | 81 | 75 | — | 62 | 58 | 85 | 81 |

TABLE 2

| | | Traditional process (heat setting → coating) | | | Traditional process (heat setting → coating) | | | Improved process (coating → heat setting) | |
|---|---|---|---|---|---|---|---|---|---|
| Classification | | Comparative example 1-1 Fabric | Comparative example 3-1 One-side composite membrane | Comparative example 3-2 Both-side composite membrane | Comparative example 2-1 Fabric | Comparative example 4-1 One-side composite membrane | Comparative example 4-2 Both-side composite membrane | Example 2-1 One-side composite membrane | Example 2-2 Both-side composite membrane |
| Heat setting temperature | °C. | 130 | — | — | 132.5 | — | — | 132.5 | |
| Thickness | μm | 11.0 | 14.5 | 19.0 | 11.0 | 14.5 | 19.0 | 14.5 | 19.0 |
| Permeation time | Sec/100 ml | 160 | 220 | 320 | 380 | 420 | 550 | 160 | 260 |
| Separator porosity | % | 38 | 38 | 38 | 35 | 35 | 35 | 35 | 35 |
| Tensile Str. MD | Kg/cm2 | 1700 | 1730 | 1750 | 2350 | 2400 | 2400 | 2350 | 2350 |
| TD | | 1400 | 1450 | 1450 | 1980 | 2000 | 2050 | 2000 | 2000 |
| Thermal shrinkage MD | % | <15 | <8 | <12 | <12 | <5 | <8 | <6 | <8 |
| TD | | <10 | <4 | <10 | <7 | <3 | <4 | <4 | <5 |
| Dielectric breakdown voltage | KV | 1.2~1.4 | 1.5~1.8 | 2.0~2.4 | 1.3~1.6 | 1.6~2.0 | 2.5~3.0 | 1.6~2.0 | 2.5~3.0 |
| Tortuosity | τ | 1.55 | 1.82 | 2.21 | 1.69 | 2.05 | 2.79 | 1.60 | 1.84 |
| Size of lamellar structure | nm | 110 | 110 | 110 | 160 | 160 | 160 | 150 | 150 |
| Capacity retention ratio to design capacity 25° C. After 300 cycles | % | — | 87 | 79 | — | 61 | 55 | 90 | 83 |
| 55° C. | | — | 80 | 77 | — | 47 | 58 | 84 | 82 |

As seen from above, it was found that the separators of Examples 1-1, 1-2, 2-1 and 2-2 maintained an excellent tensile strength while exhibiting better properties than the separators of Comparative examples in the aspects of the thermal shrinkage, air permeability dielectric breakdown voltage, and tortuosity.

Also, it can be seen that in terms of the size of the lamellar structure, the separators of Examples 1-1, 1-2, 2-1 and 2-2 were thicker by approximately 40 nm than the separators of Comparative examples of 1-2, 1-3, 3-1 and 3-2, and the separators of Comparative examples 2-2, 2-3, 4-1 and 4-2 had a size of a lamellar structure of an equivalent level to the separators of Examples 1-1, 1-2, 2-1 and 2-2 but showed a very high tortuosity and poor cycle performance.

Also, the cylindrical (18650) cells of Examples 1-3, 1-4, 2-3, and 2-4 exhibited excellent cycle characteristics, compared to the separators of Comparative examples.

While the present disclosure has been described in connection with a limited number of embodiments and drawings, the present disclosure is not limited thereto, and it should be understood that various changes and modifications may be made by those skilled in the art within the spirit and scope of the present disclosure and equivalents to the appended claims.

What is claimed is:

1. A separator for an electrochemical device, comprising:
a porous polymer film; and
a porous coating layer including at least one type of particles of inorganic particles and organic particles and binder polymer, the porous coating layer formed on one surface or both surfaces of the porous polymer film,
wherein the porous polymer film has a structure in which multiple fibrils arranged parallel to the surface of the porous polymer film are stacked in layers, and the fibrils are bound to each other to form a lamellar structure with a size from 130 to 200 nm and tortuosity of the porous polymer film is from 1.60 to 1.90, in which the tortuosity is calculated by the following equation:

$$(\text{Tortuosity } (\tau))^2 = N_M \times \in \qquad [\text{Equation}]$$

where $N_M$ denotes the MacMullin number and is a value obtained by dividing $\sigma_0$ by $\sigma_{eff}$, $\sigma_0$ denotes a conductivity value of a pure liquid electrolyte, $\sigma_{eff}$ denotes a conductivity value when combining the separator with the liquid electrolyte, and $\in$ denotes porosity of the separator.

2. The separator for an electrochemical device according to claim 1, wherein the tortuosity of the porous polymer film is from 1.60 to 1.75 when the porous coating layer is formed on one surface of the porous polymer film, and the tortuosity of the porous polymer film is from 1.76 to 1.90 when the porous coating layer is formed on both surfaces of the porous polymer film.

3. The separator for an electrochemical device according to claim 1, wherein the separator for an electrochemical device has a tensile strength of 2,000 to 2,500 kg/cm² in a machine direction and a tensile strength of 2,000 to 2,500 kg/cm² in a transverse direction.

4. The separator for an electrochemical device according to claim 1, wherein the porous polymer film is a porous polyolefin film.

5. The separator for an electrochemical device according to claim 4, wherein the porous polyolefin film includes polyethylene; polypropylene; polybutylene; polypentene: polyhexene: polyoctene: copolymers of at least one of ethylene, propylene, butene, pentene, 4-methylpentene, hexene and octene, or mixtures thereof.

6. The separator for an electrochemical device according to claim 1, wherein a thickness of the porous polymer film is from 5 to 50 μm, and a pore size and a porosity are from 0.01 to 50 μm and from 10 to 95%, respectively.

7. The separator for an electrochemical device according to claim 1, wherein the binder polymer includes at least one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide, or mixtures thereof.

8. The separator for an electrochemical device according to claim 1, wherein the inorganic particles include inorganic particles having a dielectric constant greater than or equal to 5, inorganic particles capable of transporting lithium ions, or mixtures thereof.

9. The separator for an electrochemical device according to claim 8, wherein the inorganic particles having a dielectric constant greater than or equal to 5 include $BaTiO_3$, $Pb(Zr,Ti)O_3$(PZT), $Pb_{1-x}La_xZr_{1-y}Ti_yO_3$(PLZT), $PB(Mg_{3}Nb_{2/3})O_3\text{-}PbTiO_3$(PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, or mixtures thereof.

10. The separator for an electrochemical device according to claim 8, wherein the inorganic particles capable of transporting lithium ions include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$ based glass (0<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$ based glass ($Li_xSi_yS_z$, 0<x<3, 0<y<2, 0<z<4), $P_2S_5$ based glass ($Li_xP_yS_z$, 0<x<3, 0<y<3, 0<z<7), or mixtures thereof.

11. The separator for an electrochemical device according to claim 1, wherein the organic particles include polystyrene, polyethylene, polyimide, melamine-based resin, phenol-based resin, cellulose, modified cellulose, polypropylene, polyester, polyphenylene sulfide, polyaramid, polyamide imide, butylacrylate-ethylmethacrylate copolymers, or mixtures thereof.

12. The separator for an electrochemical device according to claim 1, wherein each average grain diameter of the inorganic particles and the organic particles is independently from 0.001 to 10 μm.

13. An electrochemical device comprising a cathode, an anode, and a separator interposed between the cathode and the anode, wherein the separator is the separator for an electrochemical device according to claim 1.

14. The electrochemical device according to claim 13, wherein the electrochemical device is a lithium secondary battery.

15. The electrochemical device according to claim 13, wherein the electrochemical device has a capacity retention ratio of 80 to 95% after 300 cycles at the temperature of 25 to 55° C.

* * * * *